United States Patent
Sawada (10) Patent No.: US 7,419,274 B2
(45) Date of Patent: Sep. 2, 2008

(54) OPTICAL CONDUCTION UNIT AND IMAGE READER USING THE SAME

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 62 days.

(21) Appl. No.: 10/538,240

(22) PCT Filed: Dec. 10, 2003

(86) PCT No.: PCT/JP03/15823

§ 371 (c)(1),
(2), (4) Date: Jun. 7, 2005

(87) PCT Pub. No.: WO2004/054232

PCT Pub. Date: Jun. 24, 2004

(65) Prior Publication Data

US 2006/0050390 A1    Mar. 9, 2006

(30) Foreign Application Priority Data

Dec. 10, 2002  (JP) .............................. 2002-357403

(51) Int. Cl.
*G01D 11/28* (2006.01)

(52) U.S. Cl. ................... 362/26; 250/239; 250/208.1; 362/299

(58) Field of Classification Search ............. 362/609, 362/299, 235, 26, 27, 610, 623, 624; 250/234, 250/216, 208.1, 227.2, 239, 227.11
See application file for complete search history.

(56) References Cited

U.S. PATENT DOCUMENTS

| | | | | |
|---|---|---|---|---|
| 5,070,431 A | * | 12/1991 | Kitazawa et al. | 362/601 |
| 5,359,691 A | * | 10/1994 | Tai et al. | 385/146 |
| 5,751,386 A | * | 5/1998 | Kanda et al. | 349/65 |
| 5,808,708 A | * | 9/1998 | Oyama et al. | 349/65 |
| 6,259,082 B1 | | 7/2001 | Fujimoto et al. | |
| 6,417,508 B1 | * | 7/2002 | Ogura et al. | 250/227.2 |
| 6,530,669 B2 | * | 3/2003 | Toyoda | 362/610 |
| 6,685,328 B1 | * | 2/2004 | Hanson et al. | 362/610 |
| 6,935,766 B2 | * | 8/2005 | Ato | 362/633 |
| 7,014,349 B2 | * | 3/2006 | Shinohara et al. | 362/600 |
| 7,085,023 B2 | * | 8/2006 | Okamoto et al. | 358/471 |

FOREIGN PATENT DOCUMENTS

| | | |
|---|---|---|
| JP | 10-285354 | 10/1998 |
| JP | 11-52136 | 2/1999 |
| JP | 11-55456 | 2/1999 |

* cited by examiner

*Primary Examiner*—Sandra L. O'Shea
*Assistant Examiner*—Gunyoung T. Lee
(74) *Attorney, Agent, or Firm*—Hamre, Schumann, Mueller & Larson, P.C.

(57) ABSTRACT

An optical conduction unit (U) has a configuration in which one portion (Sb) and another portion (58a) of an optical conduction body (5) are mated in mutually orthogonal x, y directions with first and second fitting means (64), (64a) of the first member (60A) of a reflector (6). A portion (65b) and another portion (65c) of the second member (60B) of the reflector (6) are mated in the x, y directions with the third and fourth fitting means (64b), (64c) of the first member (60A). With such a configuration, the reflector (6) and optical conduction body (5) can be reliably assembled so that they cannot be easily separated.

9 Claims, 9 Drawing Sheets

OPTICAL CONDUCTION UNIT AND IMAGE READER USING THE SAME

TECHNICAL FIELD

The present invention relates to an image reading device for incorporation in facsimile apparatuses and various scanners for reading the image of a document and to an optical conduction unit that can be advantageously used as a structural component of the image reading device.

BACKGROUND ART

Figure 9:
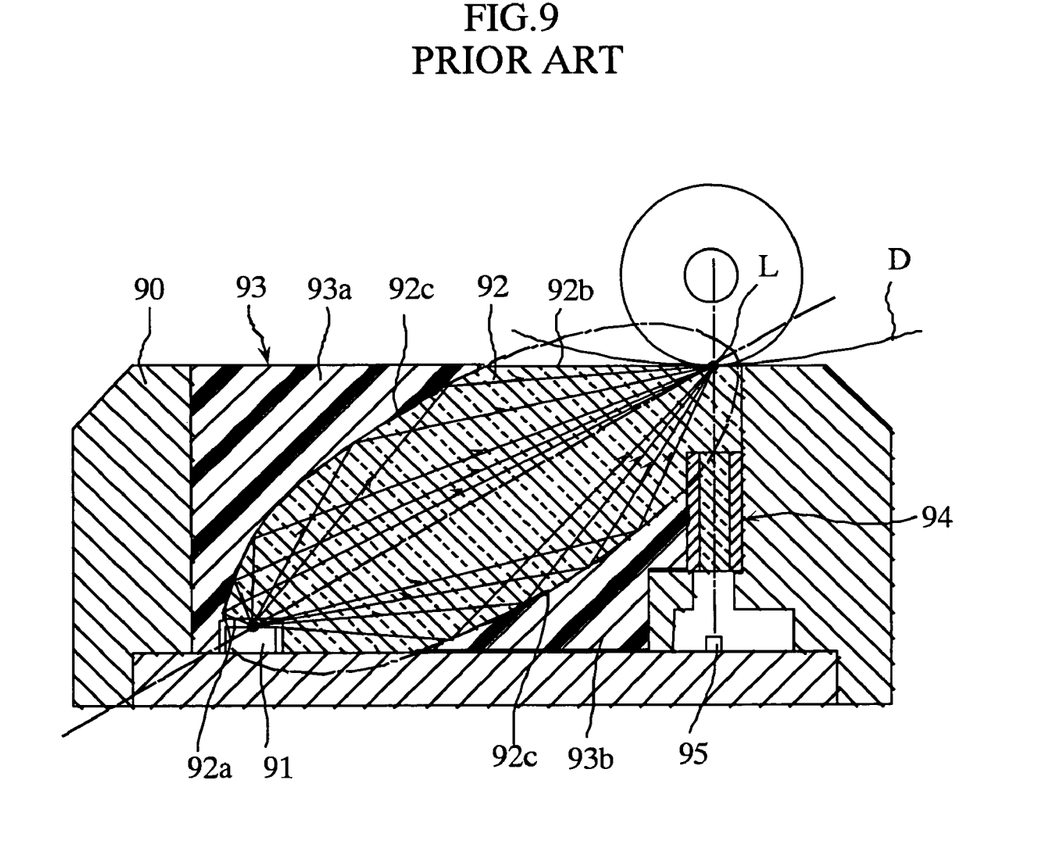
FIG. 9 is a cross-sectional view illustrating an example of the conventional image reading device.

The device described in JP-A 11-52136 is an example of the conventional image reading devices. This image reading device, as shown in FIG. 9, has a structure in which a LED chip 91, an optical conduction body 92, a reflector 93, a lens array 94, and a plurality of sensor IC chips 95 are accommodated inside a case 90. The optical conduction body 92 is in the form of a bar extending in the main scanning direction (direction perpendicular to the paper surface) and has light transparency. This optical conduction body 92 is so configured that if light emitted from the LED chip 91 propagates inside thereof from the light incidence surface 92a, this light is reflected by a pair of side surfaces 92c and goes out from a light outgoing surface 92b toward the reading light L of a document D. The light outgoing surface 92b extends in the longitudinal direction of the optical conduction body 92. Therefore, the entire reading line L of the document D can be adequately illuminated with the light.

The light is reflected by the document D and falls on the lens array 94. As a result, the light is converged onto a plurality of sensor IC chips 95, and an image in the location corresponding to the reading light of the document D is formed on the sensor IC chips 95. A plurality of sensor IC chips 95 have a photoelectric conversion function and output image signals at an output level corresponding to the quantity of received light. This series of operations is employed to read the image in the location corresponding to the reading line L of the document D.

The reflector 93 plays a role of preventing the light from leaking from a pair of side surfaces 92c of the optical conduction body 92 and is divided into a first and second members 93a, 93b sandwiching the optical conduction body 92 in the lateral scanning direction. Employing such a divided structure is undesirable because the first and second members 93a, 93b and the optical conduction body 92 are easily misaligned.

Figure 10:
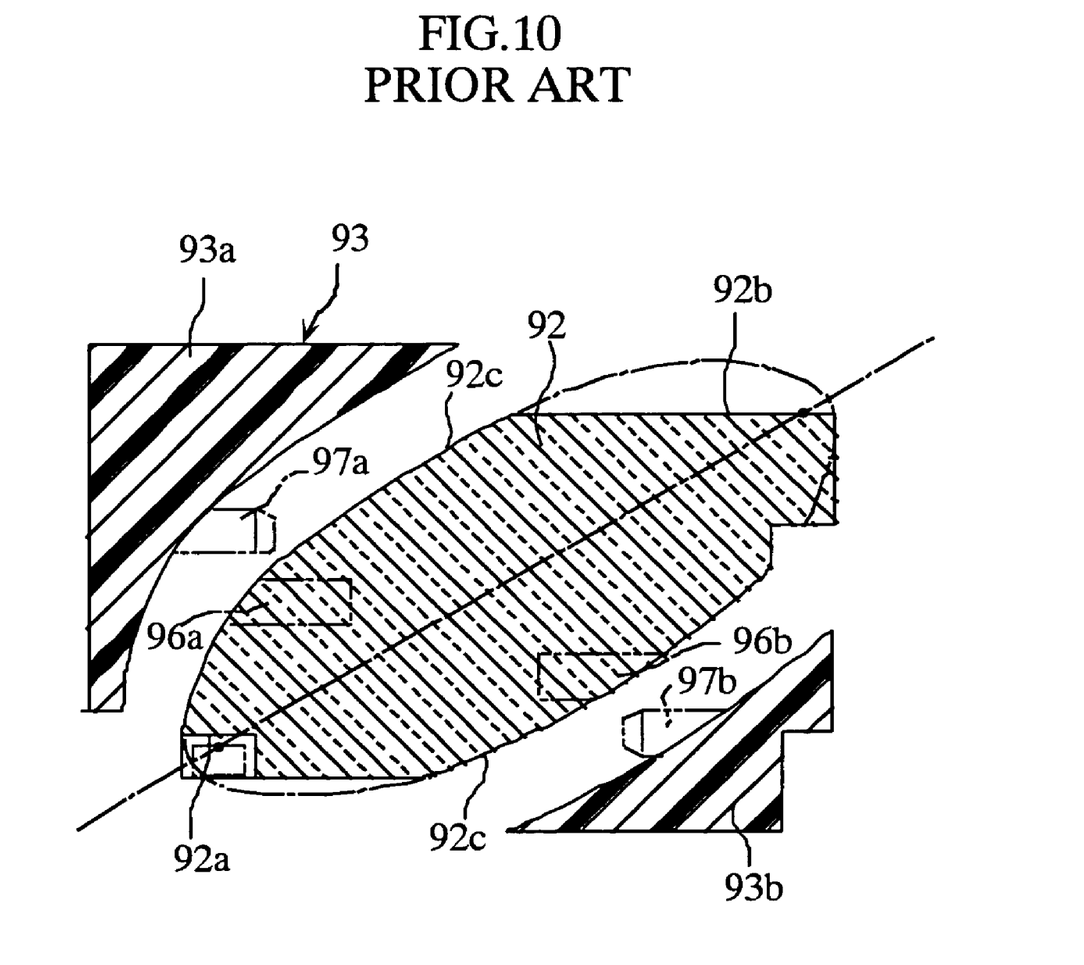
FIG. 10 is a cross-sectional view illustrating an example of the conventional optical conduction unit.

Accordingly, as shown in FIG. 10, a plurality of orifices 96a, 96b were provided in the optical conduction body 92 and a plurality of protrusions 97a, 97b were provided in the first and second members 93a, 93b to mate the optical conduction body with the members.

However, the following problems are associated with such conventional technology.

Thus, because the protrusions 97a, 97b are mated with the orifices 96a, 96b from both sides of the optical conduction body 92, they easily come out from both sides of the optical conduction body 92. Therefore, when the optical conduction body 92 and reflector 93 are handled to be assembled inside the case 90, the first and second members 93a, 93b are sometimes separated from the optical conduction body 92, thereby hindering the assembling operation. Furthermore, when the reflector 93 is assembled with the optical conduction body 92, for example, when the second member 93b is assembled after the first member 93a has been assembled with the optical conduction body 92, the optical conduction body 92 and the first member 93a have to be held reliably so as to prevent them from being separated. Therefore, the operation of assembling the optical conduction body 92 and reflector 93 is also difficult.

The above-described problems can be resolved if the fitting accuracy of orifices 96a, 96b and protrusions 97a, 97b is increased and they are tightly fitted together. However, even if such means is employed, the protrusions 97a, 97b are difficult to prevent reliably from being pulled out from the orifices 96a, 96b and the first and second members 93a, 93b are sometimes separated from the optical conduction body 92. The optical conduction body 92 and reflector 93 can be also bonded together by using an adhesive, but such an approach decreases productivity by adding an operation of coating the adhesive. Furthermore, if the adhesive adheres to the optical conduction body 92, the reflection pattern of the light in the respective portion becomes different from that in other portions and optical characteristics of the optical conduction body 92 might degrade.

DISCLOSURE OF THE INVENTION

It is an object of the present invention to provide an optical conduction unit and image reading device that can resolve or control adequately the above-described problems.

An optical conduction unit provided according to the first aspect of the present invention comprises an optical conduction body and a reflector, the optical conduction body having a light incidence surface for receiving light from a light source, a light outgoing surface extending in the prescribed x direction to cause the light that propagated from the light incidence surface inside the optical conduction body to go out to the outside, and a pair of side surfaces joined to the light outgoing surface and extending in the x direction, and the reflector having a first member and a second member for sandwiching the optical conduction body in the y direction perpendicular to the x direction and for covering the pair of side surfaces, wherein the first member comprises first fitting means for mating with a portion of the optical conduction body in the y direction, second fitting means for mating with another portion of the optical conduction body in the x direction, third fitting means for mating with a portion of the second member in the y direction, and fourth fitting means for mating with another portion of the second member in the x direction.

Preferably, the optical conduction body comprises a main region having the light outgoing surface and the pair of side surfaces and an auxiliary region joined in the x direction to the main region, and the auxiliary region has a light incidence surface and a light reflecting surface for reflecting the light that propagated from the light incidence surface inside the auxiliary region toward the main region and is configured so that the light that propagated from the auxiliary region inside the main region goes out to the outside from the light outgoing surface, while propagating in the x direction.

Preferably, the first member has a body section adjacent to the optical conduction body and extending in the x direction and a first wall section and a second wall section protruding in the y direction from the body section and facing each other via a gap, and the first fitting means comprises the first and second wall sections and has the auxiliary region inserted between those first and second wall sections.

Preferably, the first wall section covers the light reflecting surface.

Preferably, the main region has an end surface facing in the x direction and the first member has a third wall section for covering the end surface. Preferably, the a first protrusion or orifice having the central axis thereof extending in the x direction is provided in the end surface, and the second fitting means is an orifice or a protrusion provided in the third wall section so as to mate with the first protrusion or orifice.

Preferably, at one end portion of the second member in the x direction, a second protrusion or orifice having a central axis thereof extending in the y direction is provided, and at the other end portion of the second member in the x direction, a third protrusion or orifice having a central axis thereof extending in the x direction is provided, the third means is an orifice or a protrusion provided in the first member so as to mate with the second protrusion or orifice, and the fourth fitting member is an orifice or protrusion provided in the third wall section of the first member so as to mate with the third protrusion or orifice.

Preferably, the third wall section can deform elastically in the x direction.

Preferably, the reflector has a tubular portion surrounding from all four sides the region facing the light incidence surface.

Preferably, the first and second members are made from a white resin.

An image reading device provided according to the second aspect of the present invention comprises a light source, an optical conduction unit for illuminating the light emitted from the light source toward a reading ling of a document, a plurality of sensor IC chips for receiving the light reflected from the reading line and outputting an image signal, and a case accommodating those light source, optical conduction unit, and a plurality of sensor IC chips, the optical conduction unit comprising an optical conduction body and a reflector, the optical conduction body having a light incidence surface for receiving light from a light source, a light outgoing surface extending in the prescribed x direction to cause the light that propagated from the light incidence surface inside the optical conduction body to go out to the outside, and a pair of side surfaces joined to the light outgoing surface and extending in the x direction, and the reflector having a first member and a second member for sandwiching the optical conduction body in the y direction perpendicular to the x direction and for covering the pair of side surfaces, wherein the first member comprises first fitting means for mating with a portion of the optical conduction body in the y direction, second fitting means for mating with another portion of the optical conduction body in the x direction, third fitting means for mating with a portion of the second member in the y direction, and fourth fitting means for mating with another portion of the second member in the x direction.

Other features and advantages of the present invention will become more fully apparent from the following description of the preferred embodiments thereof.

BEST MODE FOR CARRYING OUT THE INVENTION

The preferred embodiments of the present invention will be described below in grater detail with reference to the appended drawings.

FIG. 1 to FIG. 4 illustrate an example of the image reading device in accordance with the present invention. As shown in detail in FIG. 2, an image reading device A of the present embodiment comprises an optical conduction unit U for guiding the light emitted from a light source 4 to the reading line L. The optical conduction unit U comprises an optical conduction body 5 and a reflector 6. The configuration of those components will be explained prior to explaining the entire structure of the image reading device A.

The optical conduction body 5 is made, for example, for an acrylic resin and is transparent. The front surface in all the locations of the optical conduction body 5 is a mirror surface. If the front surface of the optical conduction body 5 is a mirror surface, when the light is guided into the optical conduction body 5, the light that falls at the front surface of the optical conduction body 5 at an angle larger than the total reflection angle specified by the material of the optical conduction body 5 can be totally reflected. On the other hand, the light falling at an angle less than the total reflection angle can be transmitted to the outside of the optical conduction body 5.

Figure 5:
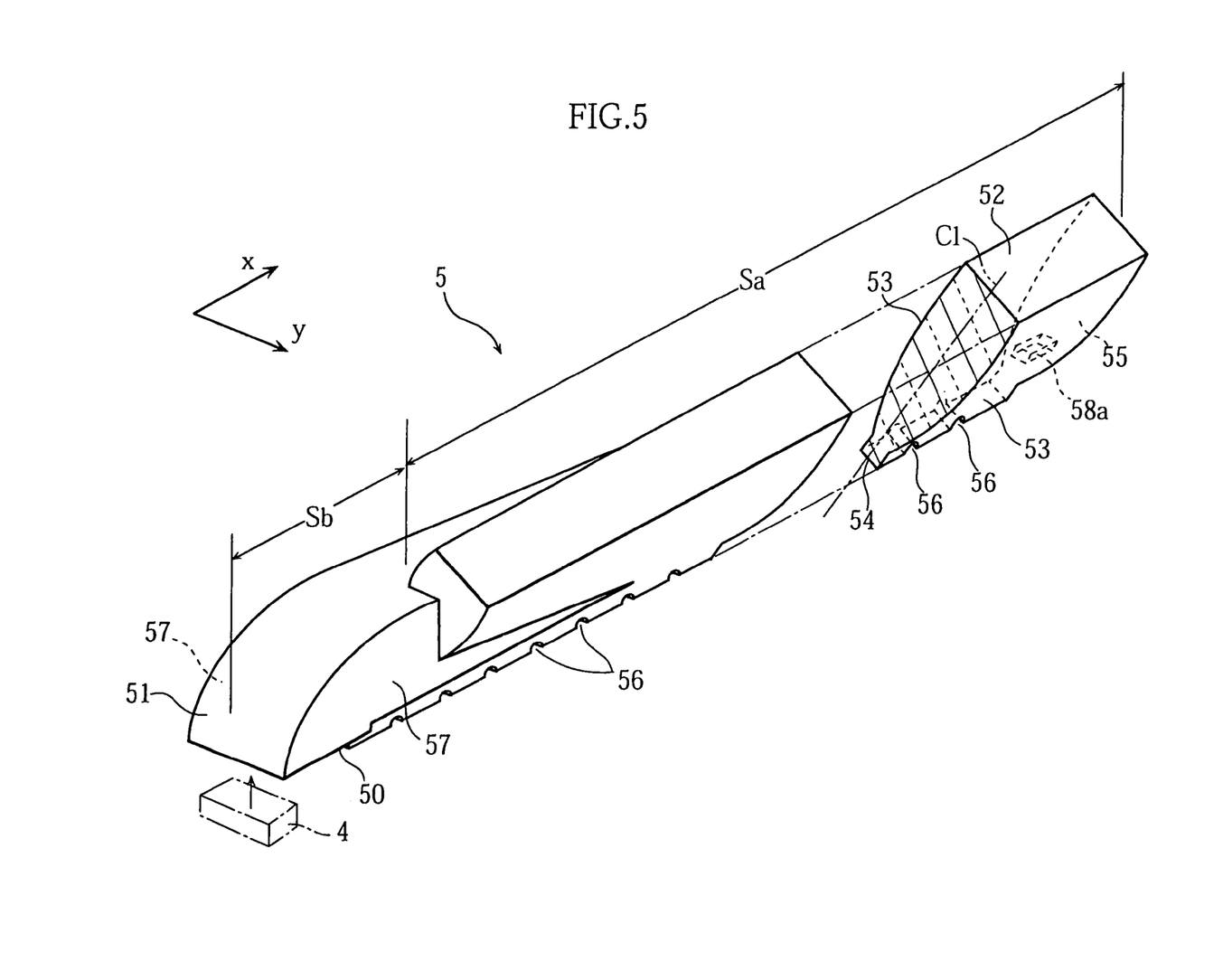
FIG. 5 is a partially cut-out perspective view illustrating an optical conduction body used in the image reading device shown in FIG. 1 to FIG. 3.

As shown in detail in FIG. 5, the optical conduction body 5 is in the form of a thin long bar extending in the x direction in the figure and has a configuration in which an auxiliary region Sb and a main region Sa are joined together in the x direction. The x direction corresponds to the main scanning direction of the image reading device A. The auxiliary region Sb is designed to lead the light emitted from the light source 4 to the main region Sa and comprises a downward light incidence surface 50 for receiving the light from the light source 4 and a light reflection surface 51 inclined with respect to the light incidence surface 50 so that the light that was transmitted through the light incidence surface 50 and propagated inside the auxiliary region Sb is reflected toward the main region Sa. The light reflection surface 51 may be a curved surface or a flat surface.

The main region Sa is a portion causing the light that propagated from the auxiliary region Sb to go out toward the reading line L and comprises a light outgoing surface 52, a pair of side surfaces 53, a bottom surface 54, and an end surface 55. The light outgoing surface 52 is a plane in the form of a thin long rectangle extending in the x direction and having a constant width. A pair of side surfaces 53 are joined to both side edges of the light outgoing surface 52 extending in the x direction and are mutually symmetrical parabolic surfaces sandwiching a central line C1 in he thickness direction of the main region Sa. With such a configuration, when the light that propagated from the position close to the bottom surface 54 toward the side surfaces 53 is further reflected toward the light outgoing surface 52 by the side surfaces 53, the light can be caused to propagate almost parallel to the central line C1 based on the characteristics of parabolic surfaces. Therefore, an effect of inhibiting the significant spread of the light outgoing from the light outgoing surface 52 can be obtained. As shown in detail in FIG. 3, the central line C1 is inclined with respect to the central line C2 in the lateral direction of the auxiliary region Sb. With such a configuration, the light incidence surface 50 receives the light from the light source 4 disposed directly therebelow, whereas the light outgoing surface 52 causes the light to go out from the location tilted downward with respect to the reading ling L, as shown in detail in FIG. 2.

Figure 6:
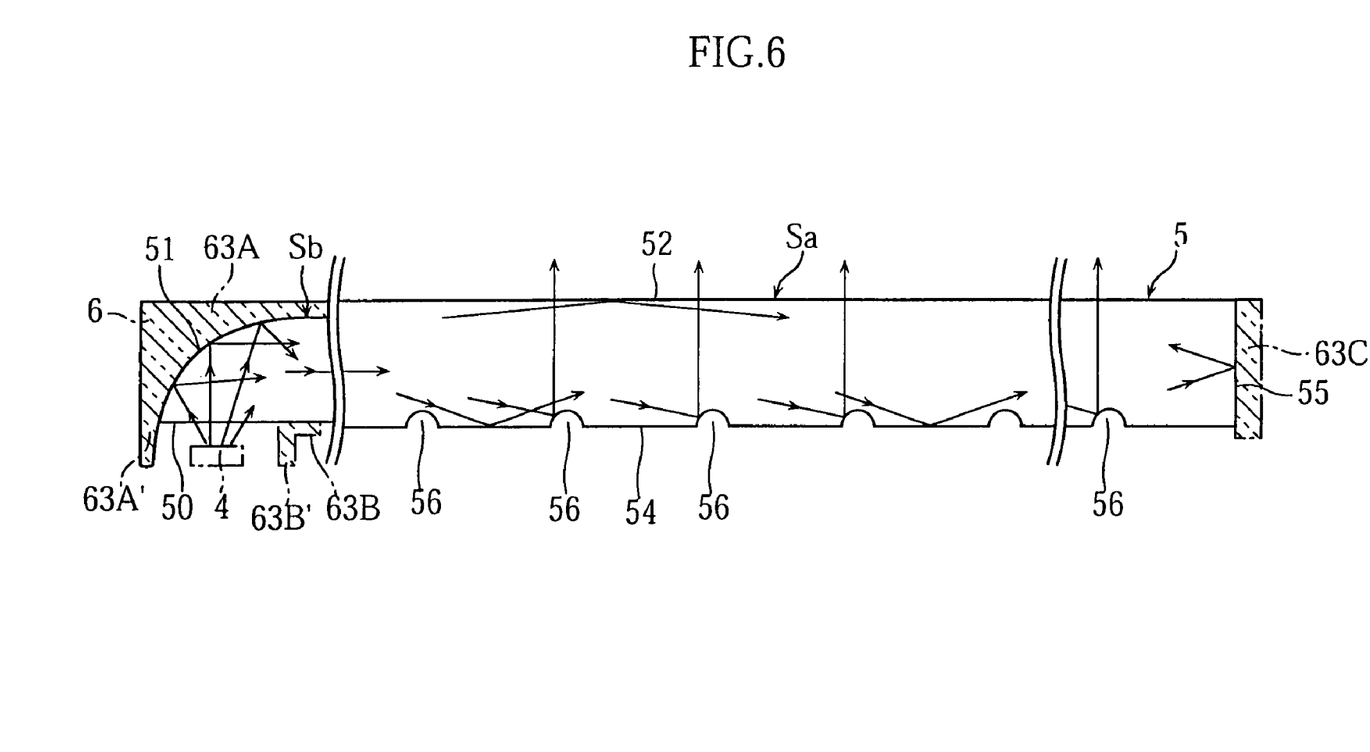
FIG. 6 illustrates the action of the optical conduction body shown in FIG. 5.

A plurality of recessed grooves 56 are provided with a spacing in the x direction in the bottom surface 54 of the main region Sa. As a result, as shown in FIG. 6, if the light propagates from the auxiliary region Sb inside the main region Sa in the optical conduction body 5, this light propagates toward the end surface 55 by means of repeated total reflections on a pair of side surfaces 53, bottom surface 54, and light outgoing surface 52. Concerning one of the reflections, in this light propagation process, because the light falls on the surface establishing the recessed grooves 56 and is reflected so that the propagation direction thereof changes significantly, a light is generated that falls on the light outgoing surface 52 at an incidence angle less than the total reflection angle. This light passes as is through the light outgoing surface 52. Based on this principle, in the optical conduction body 5, the light outgoes from each place of the light outgoing surface 52, while propagating inside the main region Sa toward the end surface 55.

Figure 7:
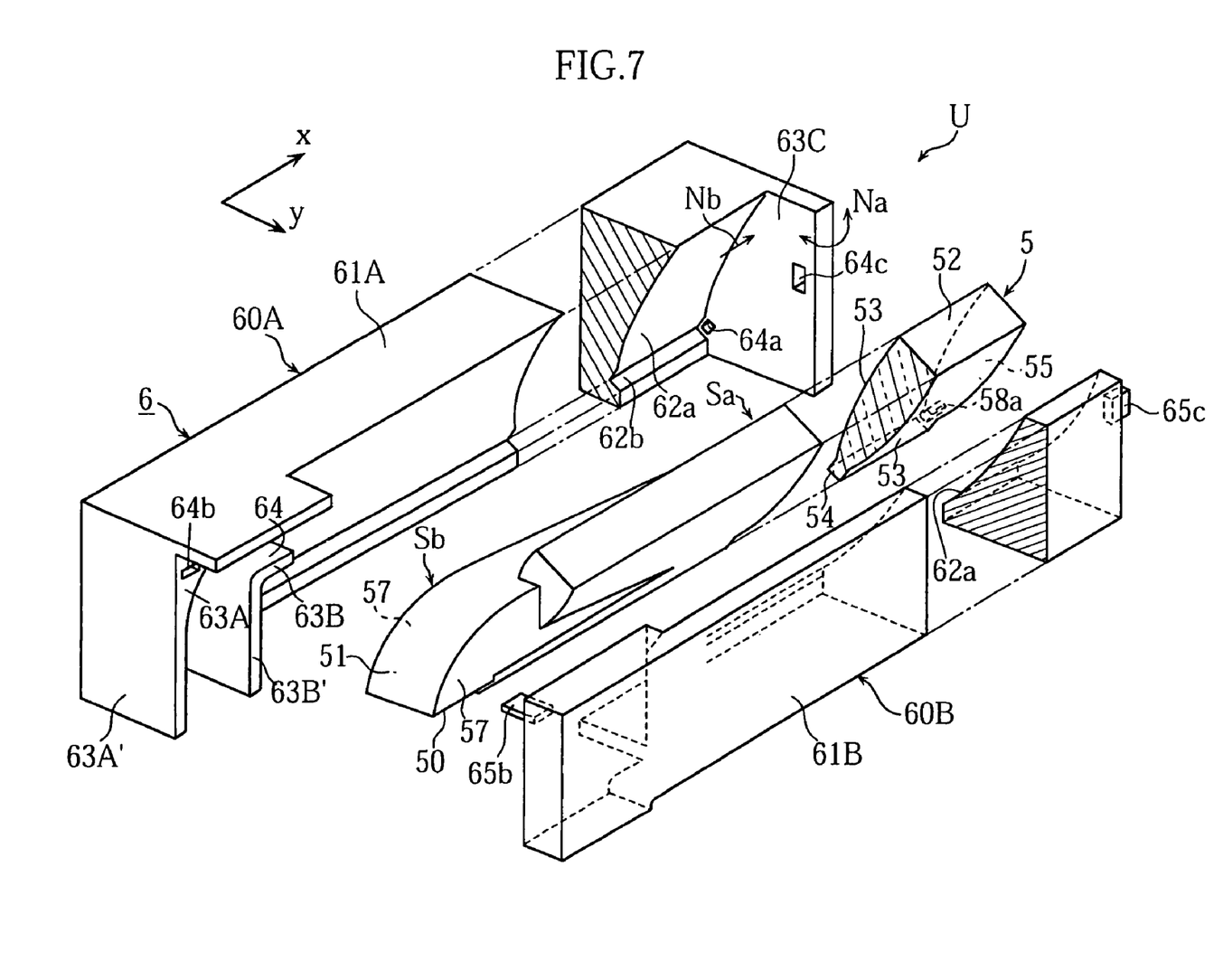
FIG. 7 is a partially cut-out exploded perspective view illustrating an optical conduction body used in the image reading device shown in FIG. 1 to FIG. 3.

As shown in detail in FIG. 7, the reflector 6 has first and second members 60A, 60B. Both members are from a white synthetic resin, and the entire outer surface thereof has a high light reflection factor.

The first and second members 60A, 60B have body sections 61A, 61B that extend in the x direction in close proximity so as to sandwich the optical conduction body 5 from both sides thereof in the y direction, which is perpendicular to the x direction. Curved surface portions 62a for providing a facing-surface contact with a pair of side surfaces 53 of the optical conduction body 5 are formed in the body sections 61A, 61B. Further, a long thin flat section 62b for providing a facing-surface contact with the bottom surface 54 of the optical conduction body 5 is also formed in the body section 61A.

First to third wall sections 63A-63C protruding in the y direction from the body section 61A are provided in a connected arrangement with the body section 61A. The first wall section 63A is formed so that it can cover the light reflection surface 51 of the optical conduction body 5. The second wall section 63B is provided so that it can support the bottom surface portion of the auxiliary region Sb. The first and second wall sections 63A, 63B constitute the first fitting means in accordance with the present invention, and the auxiliary region Sb of the optical conduction body 5 is fitted into a gap 64 between the first and second wall sections 63A, 63B.

Figure 1:
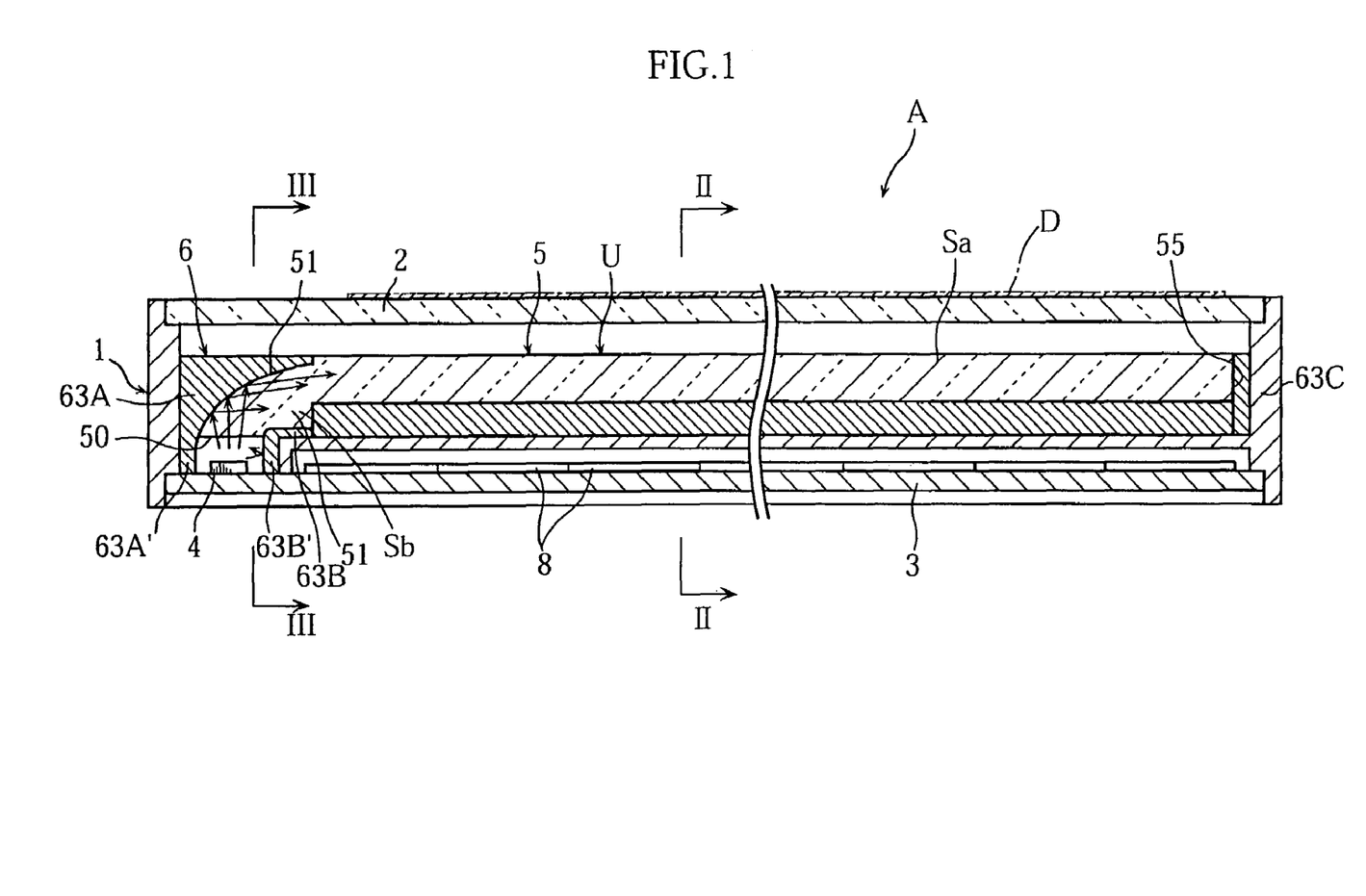
FIG. 1 is a cross-sectional view illustrating an example of the image reading device in accordance with the present invention.
Figure 3:
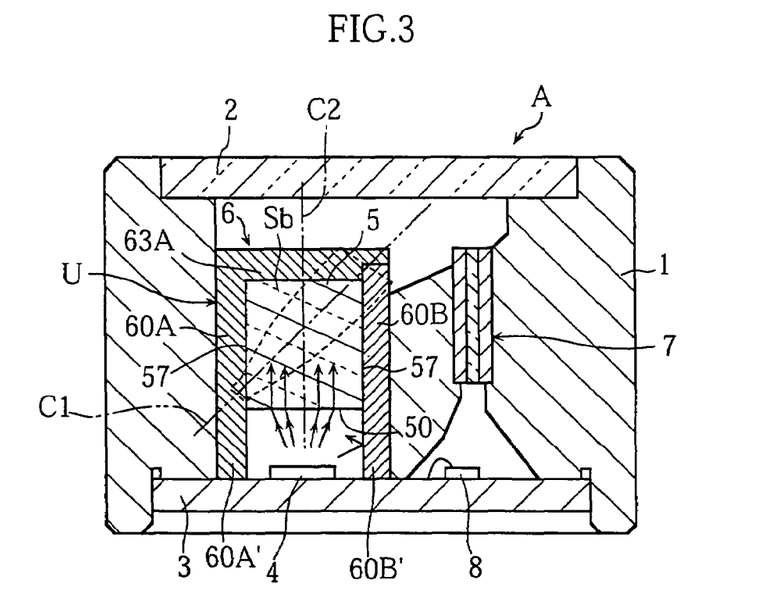
FIG. 3 is a cross-sectional view along III-III in FIG. 1.
Figure 4:
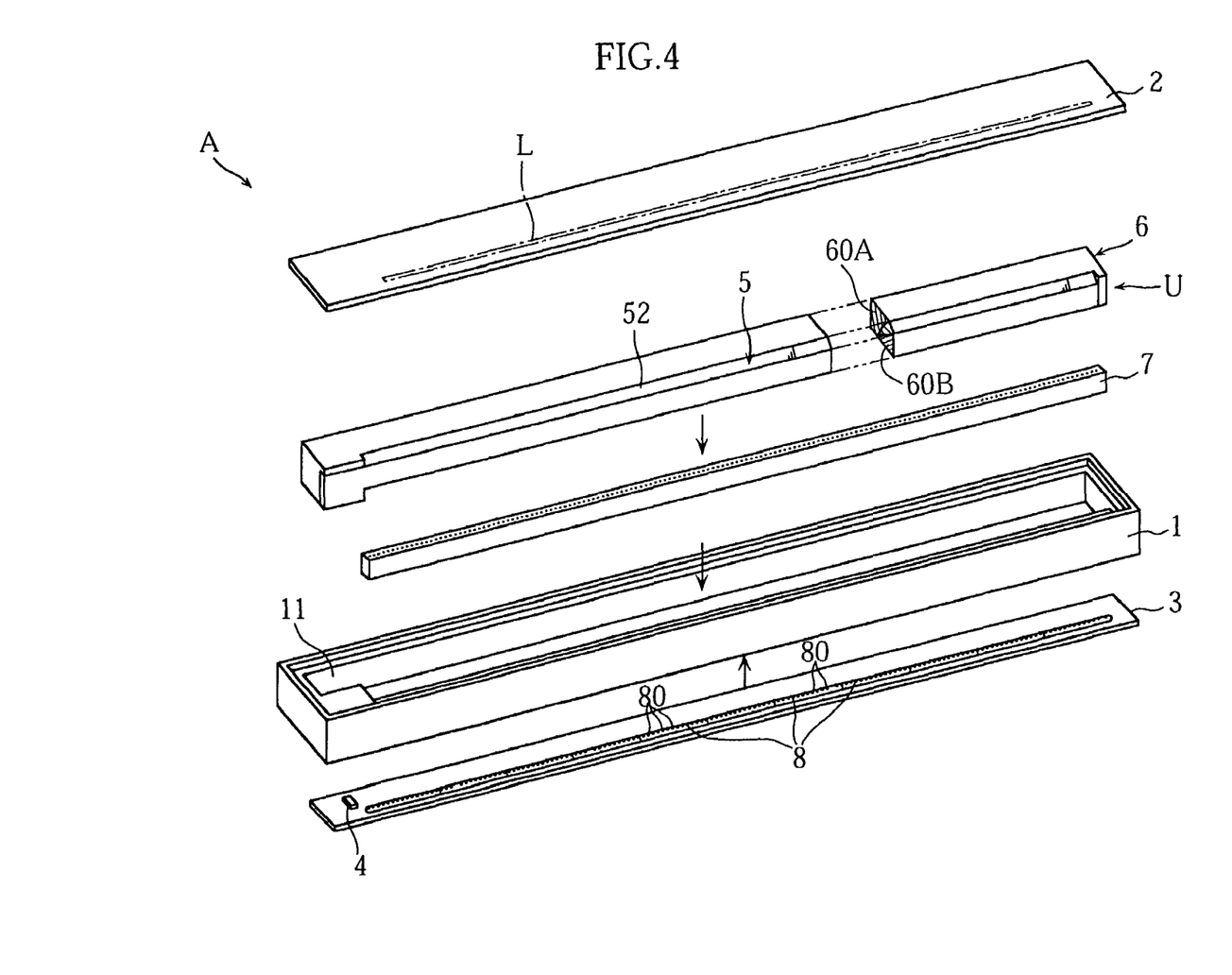
FIG. 4 is an exploded perspective view of the image reading device shown in FIG. 1 to FIG. 3.

The first and second wall sections 63A, 63B, as shown in detail in FIG. 1, have extending sections 63A', 63B' extending downward from the light incidence surface 50 and facing each other via a gap. As shown in FIG. 3, one end portion of each of the first and second members 60A, 60B in the x direction has sections that are in contact with both side surfaces 57 of the auxiliary region Sb and extending sections 60A', 60B' that extend downward from the light incidence surface 50 and face each other via a gap. The four extending sections 60A', 60B', 63A', 63B' constitute a tubular section surrounding from all four sides the region where the light source 4 located below the light incidence surface 50 is disposed.

As shown in detail in FIG. 7, three orifices 64a-64c are formed in the first member 60A. Those orifices are equivalent to an example of the second to fourth fitting means in accordance with the present invention. The orifices 64a, 64c are provided in the third wall section 63C so that the axes thereof extend in the x direction. Protrusions 58a, 65c with central axes thereof extending in the x direction are provided in the end surface 55 of the optical conduction body 5 and the end surface at one end portion of the second member 60B in the x direction, and those protrusions 58a, 65c serve to mate with the orifices 64a, 64c, respectively. An orifice 64b is provided in the first wall section 63A so that the axis thereof extend in the y direction. A protrusion 65b with the central axis thereof extending in the y direction is provided in the other end section of the second member 60B in the x direction, and this protrusion 65b serves to mate with the orifice 64b. The orifices 64a-64c may be through holes or blind holes. The third wall section 63C serves to come into facing-surface contact with the end surface 55 of the optical conduction body 5 and prevent the light from leaking to the outside from the end surface 55. The third wall section 63C can be deflected by means of an elastic recovery force in the direction shown by arrow Na in FIG. 7 with respect to the body section 60A.

The configuration of other components of the image reading device A will be described below.

Figure 2:
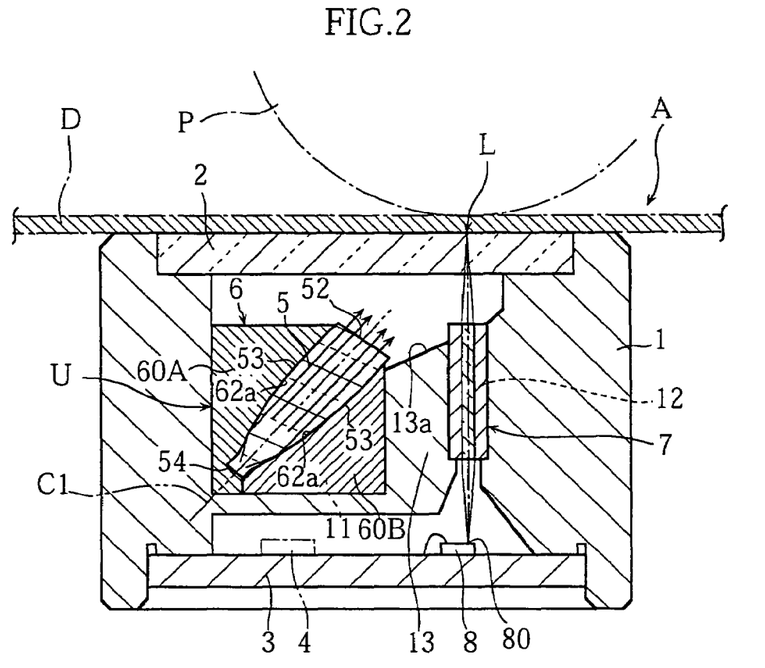
FIG. 2 is a cross-sectional view along II-II in FIG. 1.

As shown in detail in FIG. 2, in addition to the optical conduction unit U and light source 4, the image reading device A comprises a case 1, a transparent plate 2, a substrate 3, a lens array 7, and a plurality of sensor IC chips 8.

The case 1 is manufactured, for example, from a black synthetic resin, and the surface of each section of the case 1 is of black color with a low light reflection factor. The light source 4, optical conduction unit U, lens array 7, and a plurality of sensor IC chips 8 are accommodated inside the case 1. The substrate 3 is assembled with the bottom section of the case 1, and the light source 4 and a plurality of sensor IC chips 8 are mounted on the upper surface of the substrate 3.

The transparent plate 2 is made from glass or a synthetic resin, mounted on the upper surface of the case 1, and serves to support and guide the document D. A platen roller P is disposed above the transparent plate 2, and the document D is transported in the auxiliary scanning direction, while being in contact with the surface of the transparent plate 2, by the rotation of the platen roller P. Of the portions of the upper surface of the transparent plate 2, the zone immediately above the lens array 7 is equivalent to the reading line L.

The light source 4 is the so-called point light source and has a configuration in which LED chips of three types generating light of red, green, and blue (R, G, B) colors are assembled in a transparent resin package. Such a configuration can be adapted for reading color images. However, a configuration of the light source 4 that uses a LED emitting light of white color or monochromatic light of any other color may be also employed, this configuration being adapted for reading monochromatic images. This light source 4 is provided in a location close to one end portion of the substrate 3 in the longitudinal direction thereof.

The optical conduction unit U is assembled with the case 1 by fitting into a recess 11 formed in the case 1. The light incidence surface 50 of the optical conduction body 5 is positioned directly above the light source 4, and the light outgoing surface 52 is disposed so that the light can be reflected toward the reading line L from the direction inclined downward with respect to the reading line L. The first member 60A of the reflector 6 is disposed at a height such that it does not protrude upward from the light outgoing surface 52 of the optical conduction body 5. The second member 60B is configured so that it does not project toward the lens array 7 from the light outgoing surface 52. With such a configuration, part of the reflector 6 is not present around the optical path from the light outgoing surface 52 to the reading line L. Therefore, part of the light that went out from the light outgoing surface 52 and was reflected by the document D is prevented from being reflected by the reflector 6 toward the reading line L and then improperly falling on the lens array 7. Such an effect might degrade the quality of the read-out image, but in the present embodiment, this inconvenience can be prevented. The lens array 7 and optical conduction unit U are separated by a partitioning section 13 of the case 1, and the upper surface 13a of the partitioning section 13 is inclined so as to face in the direction opposite to the direction toward the reading line L in the auxiliary scanning direction. With such a configuration, the light reflected from the document D is prevented from being reflected toward the reading line L by the partitioning section 13.

The lens array 7 serves to form the image of the document D on the surface of the sensor IC chip 8 by converging the light that fell on the reading line L and was reflected by the document D. For example, a configuration comprising a plurality of rod lenses forming an erect image of the document D of equal magnification and resin holders for holding the rod lenses in rows is used as the lens array 7. This lens array 7 is fit into the groove 12 formed in the case 1.

A plurality of sensor IC chips 8 are provided in rows extending in the main scanning direction below the lens array 7. The sensor IC chips 8 comprise a plurality of photoelements 80 and are so configured that if the light converged by the lens array 7 is received by a plurality of photoelements 80, photoelectric conversion is carried out and an image signal of an output level corresponding to the quantity of received light is outputted.

The operation of the image reading device A and optical conduction unit U of above-described configurations will be described below.

First, if the light source 4 is activated, the light emitted from the light source 4, as described hereinbelow, propagates from the light incidence surface 50 of the optical conduction body 5 inside the auxiliary region Sb of the optical conduction body 5, then propagates in the main region Sa and goes out from the light outgoing surface 52. This light is illuminated on the reading line L of the document D, and the light reflected thereby is received by a plurality of sensor IC chips 8 via the lens array 7. As a result, an image signal corresponding to the image of the reading line L of the document D is obtained. This image signal is outputted to the external device (not shown in the figure) connected to the image reading device A.

The reflector 6 covers the portions of the auxiliary region Sb of the optical conduction body 5 outside the light incidence surface 50 and portions of the main region Sa outside the light outgoing surface 52, thereby effectively preventing the light from those portions from leaking. Therefore, the illumination efficiency of the reading line L is high and a bright reading image of high quality can be obtained. Furthermore, as shown in FIG. 1 and FIG. 3, the four extending portions 60A', 60B', 63A', 63B' of the reflector 6 constitute a tubular body surrounding the optical path from the light source 4 to the light incidence surface 50. Therefore, the light emitted from the light source 4 propagates with good efficiency inside the optical conduction body 5, thereby further increasing the illumination efficiency.

The optical conduction unit U can be assembled in the manner as follows. Thus, first, in a state shown in FIG. 7, the optical conduction body 5 is mounted on the first member 60A of the reflector 6. This mounting is conducted by fitting the auxiliary region Sb of the optical conduction body 5 into the gap 64 between the first and second wall sections 63A, 63B and also fitting the protrusion 58a into the orifice 64a. If the distance between the third wall section 63C and gap 64 is expanded by applying pressure in the direction shown by arrow Nb in FIG. 7 and bending the third wall section 63c, then the interference of the protrusion 58a and third wall section 63c can be avoided and the protrusion 58a can be smoothly inserted into the orifice 64a. With the above-described fitting operation, the optical conduction body 5 can be held by the first member 60A. Because the protrusion 58a and orifice 64a are mated in the x direction, the optical conduction body 5 cannot be easily separated from the first member 60A in the y direction.

Then, the protrusions 65b, 65c of the second member 60B of the reflector 6 are inserted into the orifices 64b, 64c of the first member 60A. In the course of this operation, too, the interference of the protrusion 65c and the third wall section 63C can be avoided and the mating operation thereof can be conducted smoothly by applying pressure in the direction of arrow Nb and bending the third wall section 63c. If the above-described fitting is carried out, the second member 60B can be assembled with and held by the first member 60A of the reflector 6. Because the protrusion 65c and orifice 64c are mated in the x direction, the second member 60B cannot be easily separated from the first member 60A in the y direction.

As described hereinabove, the optical conduction unit U can be assembled in a simple manner by successively attaching the optical conduction body 5 and the second member 60B to the first member 60A of the reflector 6. Because the optical conduction body 5 and the second member 60B are assembled so that they cannot be easily separated from the first member 60A in the y direction, when the optical conduction unit U is handled, the probability of their inadvertent separation is low and the operation of assembling the optical conduction unit U with the case 1 can be adequately conducted.

Figure 8:
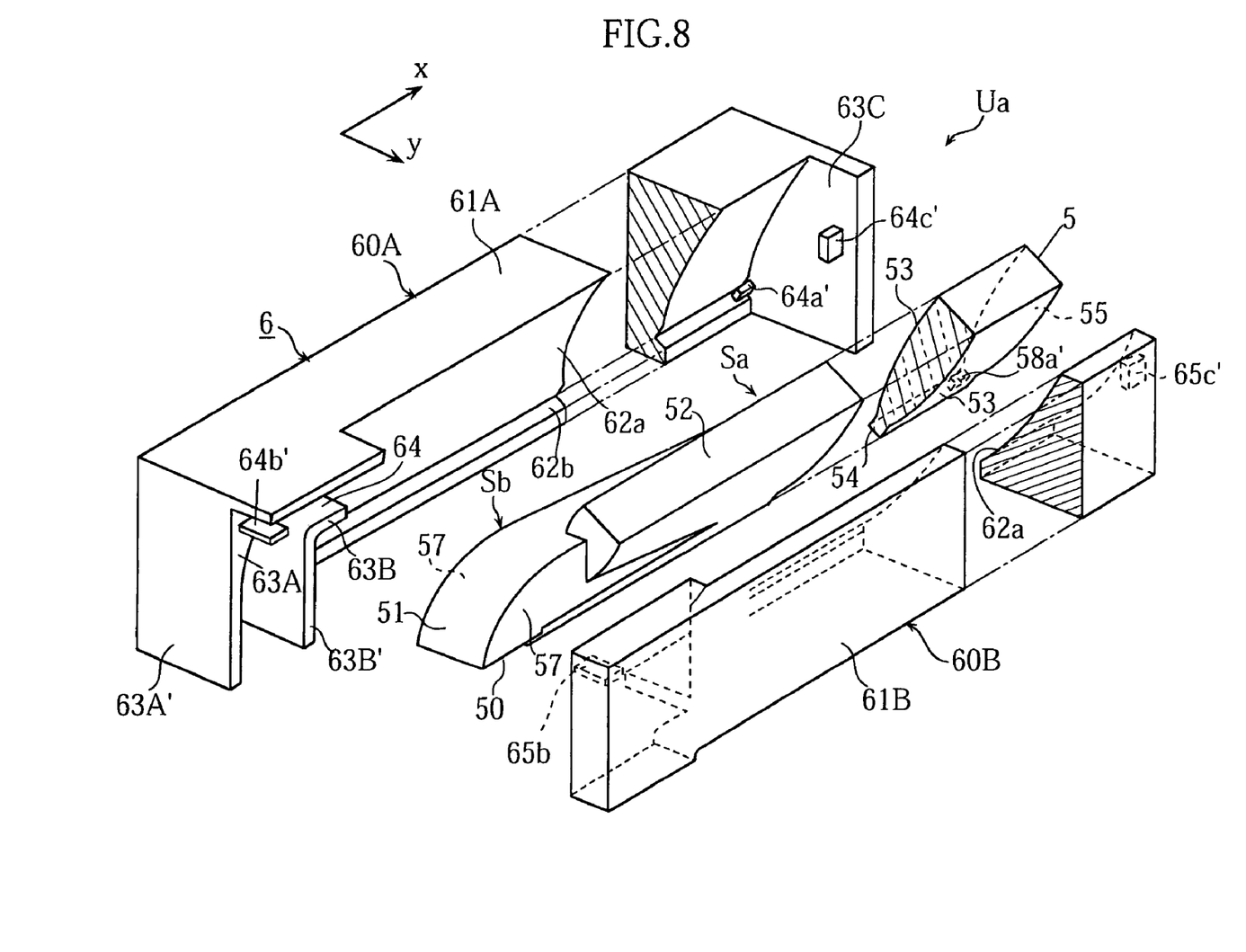
FIG. 8 is a partially cut-out exploded perspective view illustrating another example of the optical conduction unit in accordance with the present invention.

FIG. 8 illustrates another embodiment of the optical conduction unit in accordance with the present invention. In this figure, the elements identical or similar to those of the above-described embodiment are assigned with the same reference symbols as in the above-described embodiment.

In the optical conduction unit Ua shown in the figure, the first member 60A of the reflector 6 is provided with three protrusions 64a'-64c'. Correspondingly thereto, the optical conduction body 5 is provided with an orifice 58a' for mating with the protrusion 64a', and the second member 60B is provided with the orifices 65b', 65c' for mating with the protrusions 64b', 64c'.

Comparison of this optical conduction unit Ua with the optical conduction unit U of the above-described embodiment shows that the protrusions and orifices changed places. However, similarly to the optical conduction unit U, the optical conduction body 5 and the second member 60B can be assembled with the first member 60A so that they cannot be easily separated therefrom in the y direction. Therefore, the effect identical to that described with reference to the optical conduction unit U can be obtained. This result demonstrates that the fitting means provided on the first member of the reflector may be either a protrusion or a recess.

The present invention is not limited to the above-described embodiments. The design of specific configurations of each part of the optical conduction unit and image reading device in accordance with the present invention can be changed in a variety of ways.

For example, instead of using an optical conduction body, in which a lower surface at one end in the longitudinal direction serves as a light incidence surface, an optical conduction body with a light incidence surface on the portion other than the lower surface can be used. Furthermore, an optical conduction body with a configuration of a type other than that in which the light propagates inside the optical conduction body in the longitudinal direction of the optical conduction body, as in the optical conduction body of the conventional technology illustrated by FIG. 9 and FIG. 10, can be also used.

The reflector can be formed to a variety of shapes correspondingly to the shape of the optical conduction body. Though it is preferred that the reflector be configured so that, of the outer surface of the optical conduction body, the entire surface, except the light incidence surface and light outgoing surface, be covered, this configuration is not limiting, and on the outer surface of the optical conduction body, there may be portions that are not covered with the reflector. The reflector in accordance with the present invention may be configured so as to cover at least a pair of side surfaces joined to the light outgoing surface of the optical conduction body. The material of the reflector may be other than the white resin.

The image reading device in accordance with the present invention can be configured as an image reading device, for example, of a handy scanner type, rather than the device in which the document is transported in the auxiliary scanning direction by using a platen roller.

What is claimed is:

1. An optical conduction unit, comprising:
   an optical conduction body;
   a reflector;
   wherein said optical conduction body includes a light incidence surface for receiving light from a light source, a light outgoing surface extending in the prescribed x direction to cause the light that propagated from said light incidence surface inside the optical conduction body to go out to the outside, and a pair of side surfaces joined to the light outgoing surface and extending in the x direction;
   wherein said reflector includes a first member and a second member for sandwiching said optical conduction body in the y direction perpendicular to the x direction and for covering said pair of side surfaces;
   wherein said first member comprises first fitting means for mating with a portion of said optical conduction body in the y direction, second fitting means for mating with another portion of said optical conduction body in the x direction, third fitting means for mating with a portion of said second member in the y direction, and fourth fitting means for mating with another portion of said second member in the x direction;
   wherein said optical conduction body further includes a main region having said light outgoing surface and said pair of side surfaces and an auxiliary region joined in the x direction to the main region;
   wherein said auxiliary region includes said light incidence surface and a light reflecting surface for reflecting the light that propagated from said light incidence surface inside the auxiliary region toward said main region and is configured so that the light that propagated from said auxiliary region inside said main region goes out to the outside from said light outgoing surface, while propagating in the x direction;
   wherein said first member further comprises a body section adjacent to said optical conduction body and extending in the x direction and a first wall section and a second wall section protruding in the y direction from the body section and facing each other via a gap; and
   wherein said first fitting means comprises said first and second wall sections and has said auxiliary region inserted between the first and second wall sections.

2. The optical conduction unit according to claim 1, wherein said first wall section covers said light reflecting surface.

3. The optical conduction unit according to claim 1, wherein said main region comprises an end surface facing in the x direction and said first member comprises a third wall section for covering said end surface.

4. The optical conduction unit according to claim 3,
   wherein a first protrusion or orifice having a central axis thereof extending in the x direction is provided in said end surface, and
   wherein said second fitting means is an orifice or a protrusion provided in said third wall section so as to mate with said first protrusion or orifice.

5. The optical conduction unit according to claim 4,
   wherein at one end portion of said second member in the x direction, a second protrusion or orifice having a central axis thereof extending in the y direction is provided, and at the other end portion of said second member in the x direction, a third protrusion or orifice having a central axis thereof extending in the x direction is provided;
   wherein said third means is an orifice or a protrusion provided in said first member so as to mate with said second protrusion or orifice; and
   wherein said fourth fitting member is an orifice or protrusion provided in the third wall section of said first member so as to mate with said third protrusion or orifice.

6. The optical conduction unit according to claim 5, wherein said third wall section can deform elastically in the x direction.

7. The optical conduction unit according to claim 1, wherein said reflector includes a tubular portion extending from said light incidence surface.

8. The optical conduction unit according to claim 1, wherein said first and second members are made from a white resin.

9. An image reading device comprising a light source, an optical conduction unit for illuminating light emitted from the light source toward a reading line of a document, a plurality of sensor integrated circuit (IC) chips for receiving the light reflected from said reading line and outputting an image signal, and a case accommodating the light source, the optical conduction unit, and the plurality of sensor IC chips;
   wherein said optical conduction unit comprises an optical conduction body and a reflector;
   wherein said optical conduction includes a light incidence surface for receiving light from a light source, a light outgoing surface extending in the prescribed x direction to cause the light that propagated from said light incidence surface inside the optical conduction body to go out to the outside, and a pair of side surfaces joined to the light outgoing surface and extending in the x direction;
   wherein said reflector includes a first member and a second member for sandwiching said optical conduction body in the y direction perpendicular to the x direction and for covering said pair of side surfaces; and
   wherein said first member comprises first fitting means for mating with a portion of said optical conduction body in the y direction, second fitting means for mating with another portion of said optical conduction body in the x direction, third fitting means for mating with a portion of said second member in the y direction, and fourth fitting means for mating with another portion of said second member in the x direction.

* * * * *